Patented Dec. 16, 1952

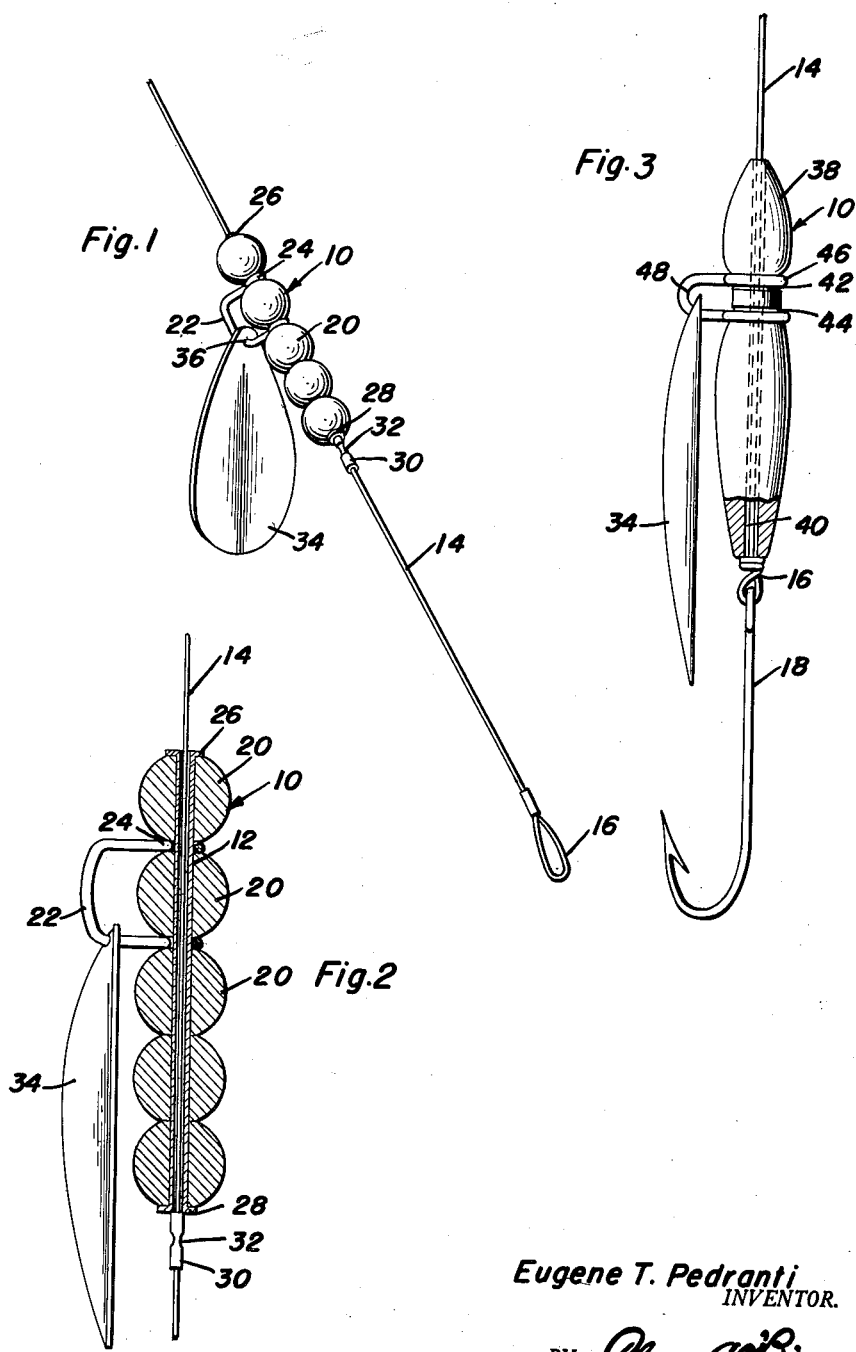

2,621,437

UNITED STATES PATENT OFFICE 2,621,437

FISH LURE

Eugene T. Pedranti, Petaluma, Calif.

Application October 2, 1950, Serial No. 187,868

5 Claims. (Cl. 43—42.19)

This invention comprises novel and useful improvements in fishing tackle, and more particularly pertains to an improved fishing lure.

An important object of this invention is to provide a fishing lure in which a spinner may be rotatably journaled on a fishing leader without causing abrasion or wear of the leader due to the rotation of the spinner thereon.

Another important object of this invention is to provide a fishing lure in which a member of a weight-forming material, or of a fish-attracting material may be detachably secured to a line in such a manner that a spinner, which is rotatably journaled on the member, will not wear the line or leader as it is rotated, and which member and spinner are detachable as a unit from the leader, so that they may be stored in a fishing box separate from the leaders and hooks, to prevent the hooks from becoming entangled with the fishing lure.

An important feature of this invention resides in the provision of a fishing lure which includes a member having an axial leader receiving bore therein, with a pair of spaced grooves on the member intermediate the ends thereof, and a U-shaped clevis having eyelets on the ends thereof, which eyelets are rotatably journaled in the grooves for movement about the axis of the member, together with a spinner attached to the clevis, whereby rotation of the spinner about the axis of the member will not cause wear on the line or leader on which the member is mounted, which member may be of a fish-attracting or line-weighting material, and which member and spinner are readily removable from the leader, to permit separate storage of the fish lure and the leader and hooks, whereby entanglement of a plurality of fish lures with the fishhooks will be prevented.

These, together with various ancillary objects and features, are attained by this device, a preferred embodiment of which has been illustrated by way of example only in the accompanying drawing, wherein:

Figure 1 is a perspective elevational view of a first embodiment in which a plurality of beads are disposed upon a tube, with the spinner-receiving clevis rotatably journaled on the tube;

Figure 2 is a longitudinal sectional view of the embodiment shown in Figure 1; and Figure 3 is a side elevational view of a second embodiment in which a unitary member has an axial bore extending therethrough, and has grooves formed intermediate the ends thereof for receiving the spinner mounting clevis, parts being broken away and shown in section to show details of construction.

Heretofore, it has been the custom to provide a unitary assembly of a leader with a plurality of beads strung on the leader, and a clevis rotatably journaled on the leader and retained in position by the beads, together with a spinner which is carried by the clevis. However, since hooks were customarily attached to the ends of the leader, the hooks tended to become tangled with the clevises and spinners of the other fishing lures. Additionally, because of the necessity of utilizing different sized hooks for various game fish, with the resulting necessity of utilizing a separate lure for each leader and hook, it has also been customary to sell the above unit in its unassembled condition. This, however, necessitated the stringing of the individual beads and clevises on the leader, which obviously consumed a considerable amount of the fisherman's time.

It is accordingly a desideratum of this invention to provide a fishing lure which is detachable from the leader and hooks, to permit storage of the lures separate from the leaders and fishhooks, and to permit a single lure to be attached to various leaders having different sized hooks thereon, and which fishing lure is nevertheless attachable as a unit to the leader and hooks, to expedite the assembling of the fishing unit.

Reference is now made more specifically to the accompanying drawings wherein like numerals designate similar parts throughout the various views, and in which the fishing lure is indicated generally by the numeral 10.

In the first embodiment of the invention, shown in Figures 1 and 2, the lure 10 includes a tube 12 which is adapted to receive a leader 14, preferably having an integral loop thereon, whereby the fishhooks 18 may be swivelly attached to the leader. A plurality of beads 20 are disposed on the tube 12, which beads may obviously be of a line-weighting material, such as lead, or of a luminescent fish-attracting material, or a combination of both. A substantially U-shaped clevis 22 is formed with eyelets 24, on the leg portions thereof, which eyelets are rotatably journaled on the tube 12 between the beads 20, whereby the clevis will be retained in a predetermined position on the tube. Obviously, one of the beads 20 may be disposed between the legs of the clevis, to retain the legs in spaced relation to each other.

The tube 12 is preferably formed with outwardly flared end portions 26 and 28 adjacent the opposite ends thereof, which flared end portions obviously retain the beads 20 in position on the tube. As is apparent from a consideration of Figures 1 and 2, a deformable sleeve 30 may also be inserted on the leader 14 and then diametrically crimped, as at 32, to retain the fishing lure in a longitudinally adjusted position on the leader.

A spinner 34, of conventional design, having an aperture 36 therein is carried by the clevis 22, for rotation therewith about the axis of the tube 12.

In the second embodiment of the invention, shown in Figure 3, the tube and beads of the first embodiment are effectively formed integrally with each other. The body member 38 is provided with an axial bore 40 therein, for receiving the leader 14, the member 38 being externally contoured to provide a pair of spaced grooves 42 and 44, intermediate the ends thereof, which grooves receive the eyelets 46 of the U-shaped clevis 48, which clevis is similar in construction to that described in the previous embodiment, and which clevis receives the spinner 34. As in the previous embodiment, the body member 38 may be of a line-weighting material, such as lead, or of a luminescent or other fish-attracting material, or a combination of both, as may be desired.

It will additionally be appreciated that deformable sleeves such as 30 may also be utilized to retain the body member 38 in position on the leader 14.

From the foregoing, it will be appreciated that the fish lure 10 may be attached to the leader or detached therefrom as a unit, thereby permitting the fish lures to be utilized on leaders having different sized hooks, and also to permit separate storage of the fish lures and the leaders and hooks. Additionally, it will be appreciated that the spinner and clevis in both of the embodiments are rotatably journaled in such a manner that wearing of the leader 14 will be prevented.

Since it is believed that the construction and operation of the device will be readily understood, further discussion is believed to be unnecessary. However, since numerous modifications will occur to those skilled in the art after a consideration of the foregoing specification and accompanying drawing, it is not intended to limit the invention to that shown and described, but all suitable modifications and equivalents may be resorted to falling within the scope of the appended claims.

Having described the invention, what is claimed as new is:

1. A fish lure comprising an elongated member having an axial bore therein adapted to receive a line, said member having a pair of longitudinally spaced annular constrictions, a U-shaped clevis having a pair of eyelets formed integrally therewith, said eyelets being rotatably received in said constrictions whereby said clevis is mounted on said member for rotation about the longitudinal axis thereof, and a spinner carried by said clevis.

2. A fish lure comprising in combination, a leader, a tubular member having an axial bore therein rotatably journaled on said leader, said member being bodily detachable from said leader by slipping it endwise on the leader a clevis rotatably journaled on said member, a spinner carried by said clevis, and means for limiting the sliding movement of said member on said leader in one direction.

3. A fish lure comprising an elongated body forming member having an axial bore therethrough, said member being provided with a pair of spaced annular grooves, a clevis having a pair of eyelets formed integrally with the ends thereof, said eyelets being rotatably journaled in said grooves, and a spinner carried by said clevis.

4. A fish lure of a type which may be readily slid on and off of a leader comprising a tube having bead assembling and retaining flanges at opposite ends, said tube having a bore of a diameter whereby the tube may be rotatably and slidably mounted on a leader, a plurality of heads arranged in end-to-end relationship on the tube and held in assembled relation between the end flanges, a U-shaped clevis including arms having eyelets, said eyelets being rotatably mounted on said tube, the arms straddling one of said beads and being interposed between other beads on opposite sides of said one bead, and a spinner carried by said clevis.

5. A fish lure comprising, in combination, a leader, a tube having bead confining and retaining flanges at its respective ends, said tube being slidable and rotatable on said leader, a clevis rotatably mounted on said tube intermediate the end portions of the tube, a spinner carried by said clevis, beads mounted on said tube and engaging said flanges and said clevis to prevent movement of the latter relative to said tube.

EUGENE T. PEDRANTI.

REFERENCES CITED

The following references are of record in the file of this patent:

UNITED STATES PATENTS

| Number | Name | Date |
|---|---|---|
| 481,652 | Loftie | Aug. 30, 1892 |
| 648,360 | Pflueger | Apr. 24, 1900 |
| 1,725,636 | Heaslip | Aug. 20, 1929 |
| 2,206,274 | Wiberg | July 2, 1940 |